United States Patent    [11] 3,616,072

| [72] | Inventor | Raymond Oliver Bostrom |
| | | Rugby, England |
| [21] | Appl. No. | 789,194 |
| [22] | Filed | Jan. 6, 1969 |
| [45] | Patented | Oct. 26, 1971 |
| [73] | Assignee | Howker Siddeley Dynamics Limited |
| | | Hatfield, Hertfordshire, England |

[54] CONTINUOUS REINFORCED PLASTICS PIPEMAKING MACHINE
18 Claims, 13 Drawing Figs.

| [52] | U.S. Cl. | 156/468, 156/244, 156/450, 156/486 |
| [51] | Int. Cl. | B65b 11/10 |
| [50] | Field of Search | 156/486, 468, 469, 244, 392, 381 |

[56] References Cited
UNITED STATES PATENTS

| 2,502,638 | 4/1950 | Becht | 156/244 X |
| 2,605,202 | 7/1952 | Reynolds | 156/244 X |
| 3,118,800 | 1/1964 | Snelling | 156/244 X |
| 3,249,481 | 5/1966 | Boggs | 156/381 X |

*Primary Examiner*—Benjamin A. Borchelt
*Assistant Examiner*—Jerald J. Devitt
*Attorney*—Dowell & Dowell ABSTRACT: A machine for the continuous manufacture of reinforced plastic pipe by winding rovings soaked in uncured or partially cured resin about a tubular plastic extrusion that advances axially over a mandrel. The rovings are supplied from cakes each of which is automatically replaced when it runs out by a spare cake. Fresh cakes are also automatically supplied from a stock of cakes. Provision is also made for continuous curing and pressure testing of the pipe.

Raymond Oliver Bostrom Inventor

By Dowell & Dowell Attorneys

Fig. 13

CONTINUOUS REINFORCED PLASTICS PIPEMAKING MACHINE

This invention relates to the continuous production of reinforced pipe of a type particularly suitable for conveying fluids under pressure.

It is an object of the invention to provide a system of manufacture enabling pipes to be produced which are particularly suitable for laying overland and under the sea in very great lengths, and indeed of virtually infinite length, by a single machine.

According to the present invention in its broadest aspect, a continuous bonded fiber pipemaking machine includes arrangements for uninterrupted supply of fiber reinforcement and other pipemaking materials whereby pipes of unlimited length can be produced without carrying out pipe-jointing operations at intervals.

There have been a number of previous proposals for 'continuous' machines to make such pipe but in all the cases of which we are aware these machines have not been truly continuous in the sense in which the word is used above in broadly defining this invention, i.e., in that they could make pipe up to any length required, for example for overland or undersea laying, without joints at intervals, but rather has the term 'continuous' been used in the prior art to mean a machine from which pipe issues endwise with progressively increasing length until such time as the machine has to be stopped, usually because a supply material has run out, which procedure still necessitates the making of pipe joints at intervals even although the individual pipe lengths may be long and the joints therefore infrequent.

The machine according to the invention may operate in the manner whereby rovings are laid up on to a nonrotating mandrel or on to an extruded liner, the rovings being preimpregnated with bonding material which is subsequently cured or fused by heat to form a rigid or semirigid pipe. In the case of resin bonding, the resin impregnation will be at least partly cured to the condition known as the 'B' stage, complete curing being subsequently effected by heat. The rovings will preferably be composed of a plurality of glass or other fibers, and may be in the form of cords of substantially circular section or in the form of tape or ribbon.

The rovings can be supplied from sets of bobbins or reels which, together with means for supporting and supplying the bobbins and heating means for bonding the fibers, comprise one winding stage. There may be provided one or more additional winding stages to produce a pipe of any desired wall thickness.

According to a preferred feature of the invention, provision is made for carrying, along with each roving supply bobbin or set of bobbins in use, a spare bobbin, and means is provided for bringing the spare bobbin into use automatically when the bobbin, or one of the set of bobbins, in use runs out, and for automatically replacing the spare bobbin by a fresh spare bobbin from a stock of bobbins. In this way, genuinely continuous production of pipe may be achieved.

The mandrel may have extruded over it a first layer of plastics or other material which serves to provide a seal for the fluids carried by the pipe. In the case of a plastics liner the plastics material so extruded will preferably be a thermoplastic such that it is at least partly solidified before the application of the layers of helical rovings. THe mandrel may be water-cooled, to assist in setting the extruded plastics layer which may also be cooled by the external application of a coolant spray before lay up of the rovings takes place.

Where a first layer of plastics or other material is extruded over the mandrel, the mandrel may have a reduction in diameter to accommodate the shrinkage of this plastics layer as it cools. Preferably, the mandrel will extend only far enough to ensure that the first plastics layer has solidified sufficiently to provide a support for the rovings of the first winding stage.

As a further possibility, the plastics layer may be applied internally by extrusion after the pipe has left the heater of the first winding station.

The heating means may be infrared, dielectric or radio frequency heating. Additionally, hot gas may be directed on to the rovings after their lay up on the mandrel in order to preheat them prior to their arrival at the heater associated with the winding stage.

One or more further plastics layers may be applied externally to the rovings during the manufacture of the pipe, thus providing interlayers and/or an external sheath. These plastics layers may be applied as a liquid extrusion or spray. Alternatively they may be applied as a powder or frit which may be fused by passage through the heaters.

The reels or bobbins from which the rovings are supplied will preferably be wound without cores or formers, so that nothing remains when any reel runs out. Such reels are commonly known as cakes. Cakes to supply the helical rovings may be carried on spindles mounted on an annular support whose axis coincides with that of the mandrel and which is rotatable about the mandrel. The spindles may extend either forwardly, i.e., in the direction of movement of the pipe, or rearwardly of the annular support. The axial rovings can be supplied from cakes mounted upon stationary spindles.

The general operating principle will be more readily understood from the following description, given by way of example of one embodiment of the invention and variants thereof, reference being had to the accompanying drawings, in which.

Figure 1:
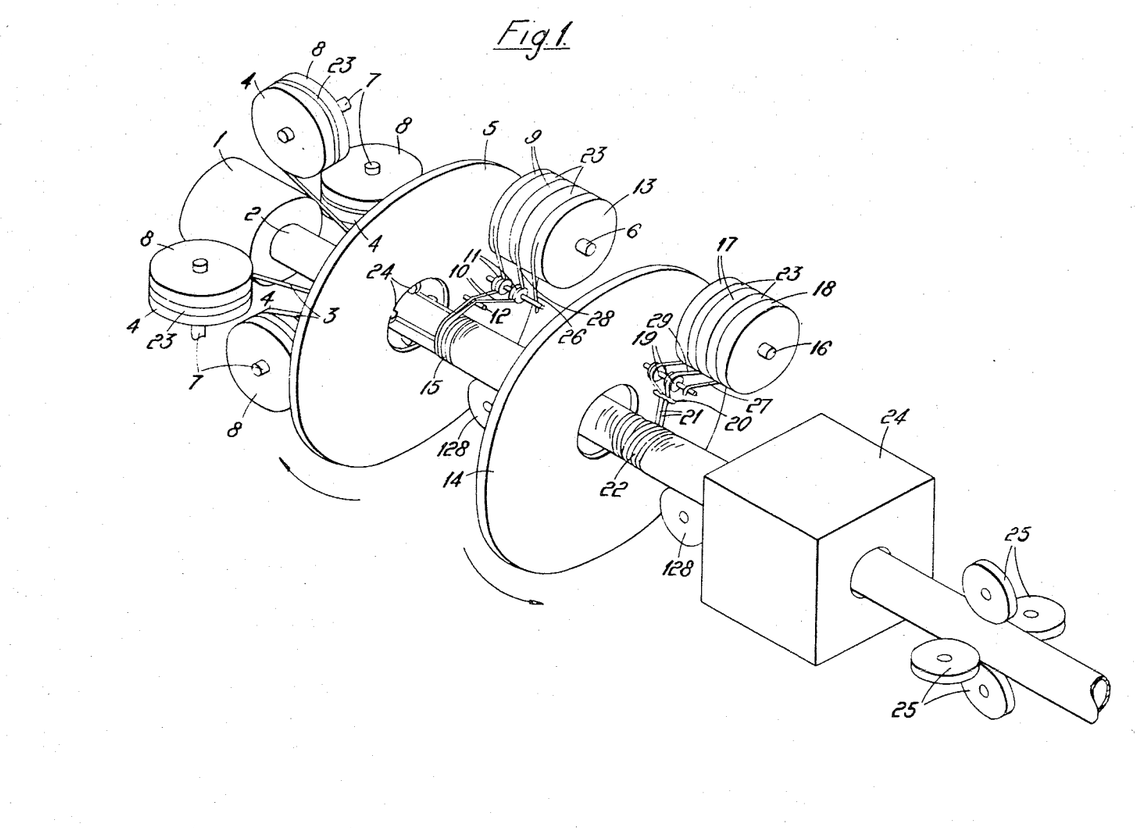
FIG. 1 is a pictorial diagram of a winding machine.

Referring firstly to FIG. 1 of the drawings an annular extrusion head 1 of known type extrudes over a mandrel a tubular layer of plastics material 1. Axial rovings 3 are supplied from cakes 4 mounted upon spindles 7 and are led via suitable tensioning means to guides 24 which apply the rovings 3 to the surface of the extrusion 2. Spare cakes 8 are also carried upon the spindles 7.

A first annular support 5 rotates about the mandrel and carries an offset spindle 6 upon which are mounted two cakes 9 from each of which the rovings 10 which form a first helical layer 15 are supplied via tensioning means 11 and guides 12. At least one spare cake 13 is also carried on the spindle 6. Clearances 23 are maintained between the cakes for both axial and helical rovings.

A second annular support 14 rotates about the mandrel in a direction opposite to that of the first annular support 5 and carries an offset spindle 16, cakes 17, 18, tension means 19 and guides 20 in a like manner to the first annular support 5 thereby laying up the rovings 21 in a second helical layer 22 at an angle to the first helical layer 15.

The free ends 26, 27 of the rovings on the spare cakes 13, 18 are held in a position near the rovings 28, 29 fed from their adjacent cakes 9, 17. A similar provision will be made in respect of the free ends of the rovings on the spare cakes 8 for the axial rovings 3.

A heater 24 bonds the rovings to form the pipe. Provision may be made to carry away vapors produced by the curing process.

Pressure rollers or tracks 25, suitably geared to the annular supports 5, 14, draw off the pipe. The axial rovings 3 operate to prevent the tension exerted by the pressure rollers 25 from opening the helical rovings 15, 22 before the pipe is cured. Additional rollers 128 may be placed at intervals along the lengths of the machine to support the pipe and mandrel or the pipe alone.

The arrangement shown in FIG. 1 will permit only a relatively low rate of manufacture if the rovings 10 and 21 are narrow. Faster manufacture may be achieved by increasing the speed of the machine. This will, however, introduce difficulties in maintaining a supply of cakes for the helical rovings. Faster manufacture will be possible at a relatively low machine speed if the helical rovings 10, 21 consist of wide bands.

Similarly if the axial rovings 3 consist of wide bands they may be spread by the guides so as substantially to cover the entire circumference of the extruded plastics tube 2. The guides may in this case be annular with their axes coinciding with the axis of the mandrel.

It is however disadvantageous for the rovings to be wound upon the cakes as wide bands, since this will introduce large discontinuities in the layup of the pipe when a cake runs out. Additionally, the cakes themselves will be large and difficult to handle.

Therefore, in the preferred arrangement, there will be a plurality of spindles upon each annular support and each spindle will carry a relatively large number of cakes. When a spindle is full at least one cake on that spindle will be a spare, and the remainder, referred to as working cakes, will supply rovings for lay up on the pipe. Rovings from each working cake will be led via tensioning means and guides to be laid up helically upon the pipe as previously described. Rovings from all the working cakes on any one spindle will preferably be led so as to lie adjacent to one another on the pipe in the form of a ribbon or band.

Similarly, a plurality of stationary spindles each with working and spare cakes, may be provided for the axial rovings so as to cover completely the mandrel or extruded tube as appropriate.

All the cakes on one or more spindles for either the axial or helical layers may be wound from rovings consisting at least in part of metal filaments such that each roving is electrically conductive along its whole length. Such rovings when embedded in the pipe can aid electromagnetic detection of the position of the pipe by any appropriate known means or be used as a conductor to transmit signals along the pipe.

Figure 2:
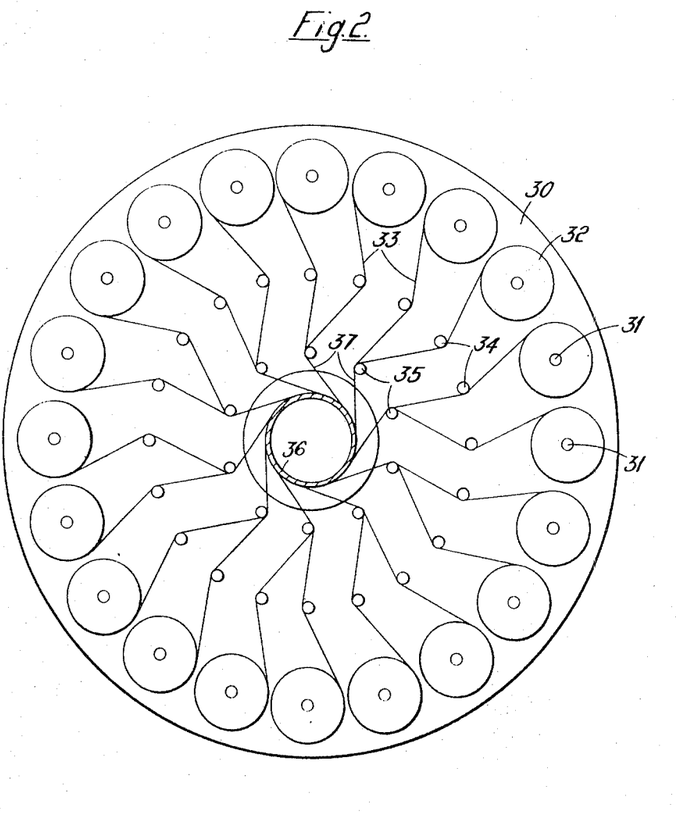
FIG. 2 is a diagram illustrating an arrangement of a rotary cake support for the machine.

An end view of an annular support in accordance with the immediately foregoing description is shown diagrammatically in FIG. 2, in which the annular support 30 supports 20 spindles 31 each of which carries a number of cakes 32 at least one of which is a spare cake, the others being working cakes. Rovings 33 from each working cake are led via tensioning means 34 and guides 35 to be laid up helically on the pipe 36. Rovings from pairs of adjacent spindles, after passing through their respective tensioners, are led to a single guide and applied to the pipe 36 as bands 37. In one arrangement there will be 11 working cakes on each spindle 31. Each band 37 will therefore consist of 22 rovings 33.

When any cake on a spindle runs out, thereby leaving a vacant space, the other cakes between the space and the outer end of that spindle will be urged to move sequentially so as to fill the space. It the machine is so constructed that the pipe axis is substantially vertical, all the spindles carrying cakes for both axial and helical rovings may be so orientated that the cakes will move under the influence of gravity.

In a preferred method of operation the cakes will be graded before starting the machine so that no two cakes on the same spindle contain the same length of roving, thereby ensuring that only one cake at a time runs out. Also preferably, the graded cakes will initially be arranged in ascending quantities of roving from the inner end of the spindle, thereby ensuring that the cake running out will always be the inner one at any stage of the pipemaking operation. Such an arrangement will cause the cakes to rotate at different speeds. They will therefore require to be separated on the spindle.

An arrangement of pawls or latches will ensure that the cakes move sequentially and also provide for separation of the cakes on the spindle.

Figure 3:
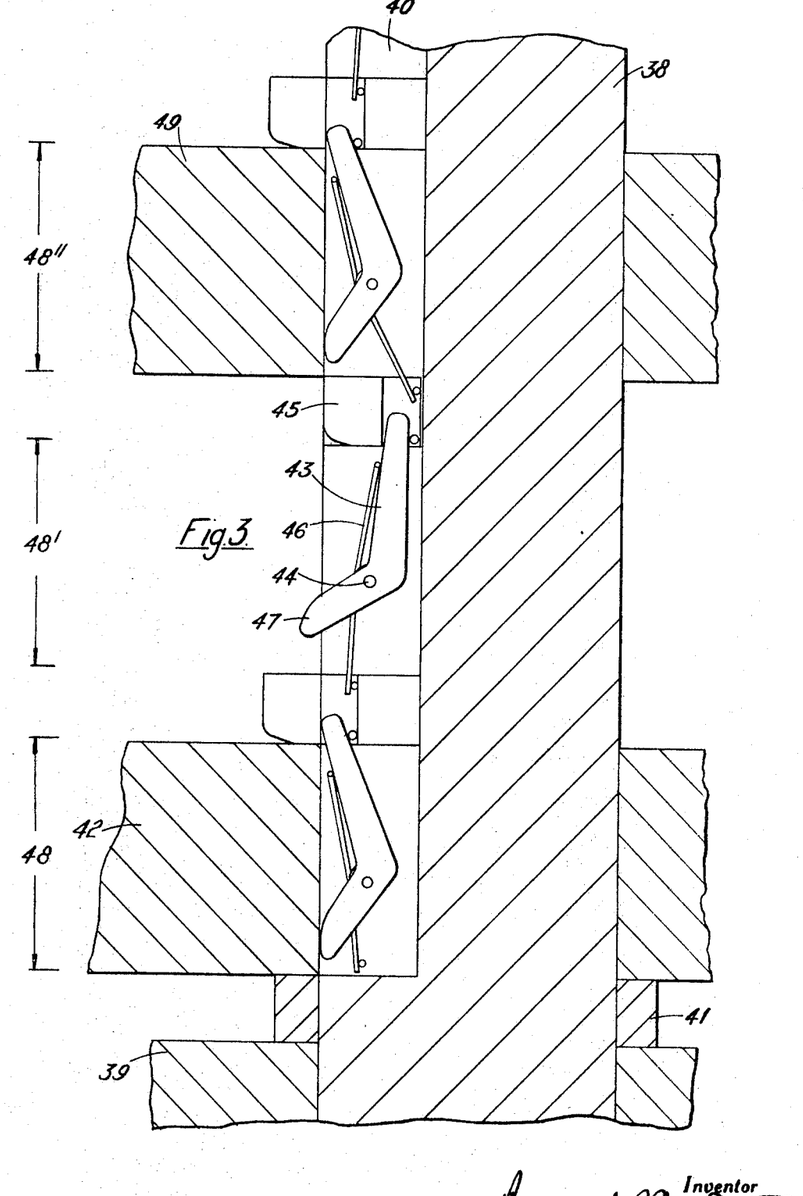
FIG. 3 is a vertical section through a cake-carrying spindle showing means for obtaining sequential movement of cakes.

FIG. 3 shows the operating principle of an arrangement of latches to ensure sequential movement of the cakes. The spindle 38 is supported by the annular support 39 and is machined or constructed to have an axial groove 40. A collar 41 spaces the inner cake 42 away from the carrier 39. A second cake 49 is shown carried on the spindle 38. At each cake location 48, 48', 48'' pawls 43 free to rotate upon pins 44 are carried within the groove 40 and coact with latches 45. Springs 46 operate to rotate each pawl 43 so that its shorter limb 47 projects above the surface of the spindle 38 when no cake is present at the appropriate location, thereby allowing the latch 45 coacting with the other arm of the lever to be retracted and release the next adjacent cake above.

If the machine is constructed so that the pipe axis is substantially horizontal the cakes for the axial rovings may still be mounted so as to be moved by gravity. The cakes for the helical rovings must, however, be moved along the spindles by other means, which may be pneumatic or hydraulic or electromagnetic, or a mechanical linkage either alone or in combination with a pneumatic, hydraulic or electromagnetic system. The same will apply to the cakes for the axial rovings if their spindles are substantially horizontal.

A pneumatic, hydraulic or electromagnetic means, used for example in conjunction with the system already described with reference to FIG. 3, may have the gas, fluid or electrical supply as appropriate controlled by operation of the latch 45 or pawl 43 at the next inward cake location. Similarly, a mechanical linkage for moving the cakes may be arranged to cooperate with the latches or pawls previously described.

Figure 4:
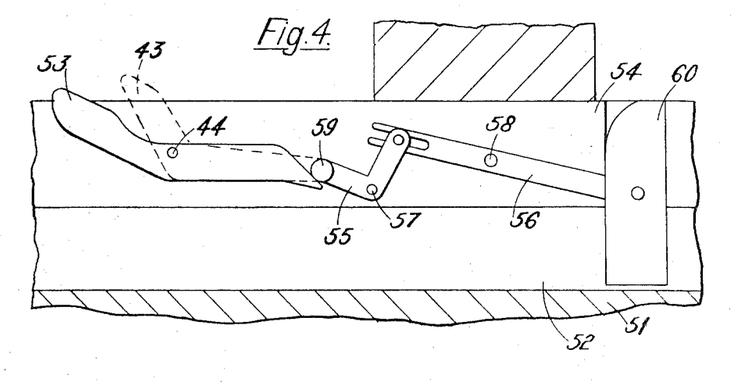
FIGS. 4, 5 and 6 show in three positional relationships, and in longitudinal section, a mechanism for shifting cakes along a horizontal spindle.
Figure 5:
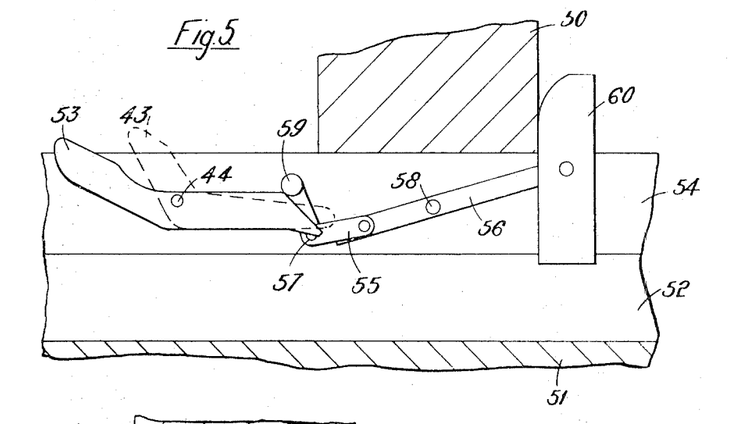
Figure 6:
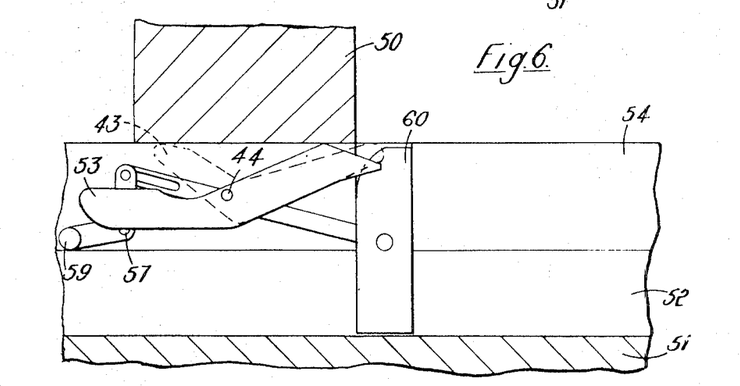

FIGS. 4, 5 and 6 show the operating principle of one example of a mechanical linkage for moving the cakes horizontally. A cake 50 is mounted on a spindle 51 which has an axial groove 52. A catch 53 is mounted within the groove 52 and is constrained to move in conjunction with the pawl 43 about the pin 44 previously described with reference to FIG. 3. Also within the groove 52 is a bar 54 which has a constant linear reciprocating motion substantially parallel to the axis of the spindle 51. The reciprocating motion may be derived by any known means from the rotary motion of the annular support described earlier with reference to FIGS. 1, 2 and 3. The bar 54, carries levers 55, 56 rotatable about pins 57, 58 respectively. A roller 59 is mounted on one arm of the lever 55. Lever 56 coacts with a latch 60 which is free to move within the bar 54.

FIG. 4 shows the bar 54 near one extremity of its travel and with no cake acting to depress the pawl 43. As the bar 54 moves to the left, roller 59 engages the catch 53 and thereby rotates levers 55 and 56 tending to raise the latch 60. FIG. 5 shows a later stage in the operation of the linkage, wherein the levers 55, 56 have further rotated, rasing the latch 60 to move the cake 50 in unison with the rod 54.

FIG. 6 shows the rod 54 near the other extremity of its travel. The pawl 43 and catch 53 have been rotated together by the combined action of the cake 50 and the roller 59. The roller 59 has dropped from the end of the catch 53, consequent rotation of the levers 55, 56 allowing the latch 60 to drop. So long as pawl 43 remains depressed by the cake 50 the roller 59 will move with the bar 54 without engaging the catch 53. Latch 60 will therefore remain depressed until the pawl 43 again lifts.

The sequential movement of cakes on any spindle as previously described will result in no cake being present at the outer location of that spindle. To ensure continuous operation arrangements must be made to supply a cake to any spindle immediately after completion of the sequential movement. Cakes for the axial rovings may be supplied by means of a simple chute or hopper since the spindles for these rovings will be stationary.

Cakes for the helical rovings will require to be fed on to moving spindles. On machines with a low consumption of cakes, i.e., those with few rovings or low speed or manufacturing small diameter pipe, it may be possible to feed the cakes by hand. Preferably, however, arrangements will be made to feed the cakes to these spindles automatically.

In the preferred arrangement, there will be a device whereby a substantially continuous supply of cakes is delivered adjacent to each annular support, together with means for ensuring that cakes are picked up from the supply device by those spindles which have one or more cakes missing. The absence from any spindle of a cake at its outer end may cause a marker or telltale to be operated or displaced by the spindle in such a way that it coacts with a corresponding detector or receptor on the device supplying the cakes, thereby initiating the transfer of a cake from the supply device to the spindle.

Figure 7:
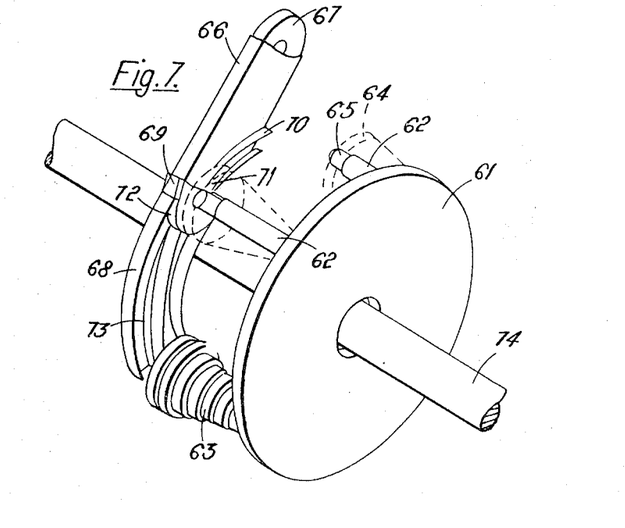
FIGS. 7, 8 and 9 are pictorial views of mechanisms for supplying spare cakes to a rotary cake support.

FIG. 7 shows an example of a device in accordance with this principle. An annular support 61, rotatable about the pipe 74, carries four spindles 62 each with a graded stack of cakes 63, the outer cake 64 on each stack being the largest. The absence of a cake on a spindle 62 due to the sequential movement of cakes along that spindle will cause a telescopic section 65 to extend axially of the spindle 62. A chute 66 carries a supply of cakes 67 and has a curved portion 68 such that the radius of the locus of the center of a cake travelling in the curved portion 68 is parallel to that of the spindles 62. Cakes 67 are normally prevented from entering the curved portion 68 by a restraint 69. Mounted on the chute 66 is a guide 70 having a ramplike profile 71. The telescopic section 65 is partially compressed by the ramp 71 and then extends fully into the center of the next cake to be supplied 72, drawing it clear of the restraint 69. As the cake 72 moves along the curved portion 68 a further ramp 73 urges the cake 72 up the spindle 62 and fully compresses the telescopic section 65 which remains latched shut until the next sequential movement.

Figure 8:
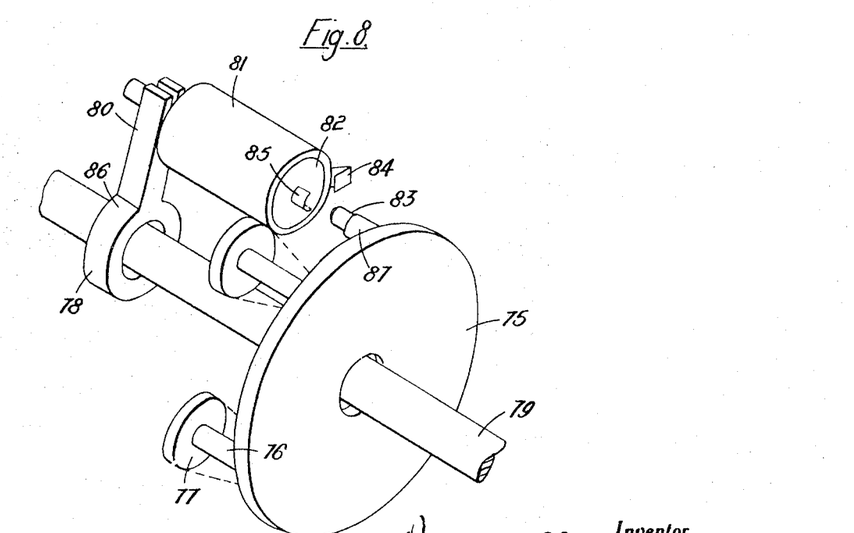

FIG. 8 shows an example of an alternative arrangement wherein the annular support 75 carries spindles 76 and cakes 77 in the manner previously described. A carrier 86 rotatable about the axis of the pipe 79 comprises a collar 78 and at least one arm 80 which supports a container 81 loaded with cakes 82 suitably spaced apart, the radius of rotation of the centers of the cakes 82 about the axis of the pipe 79 being equal to that of the spindles 76. A telescopic member 83 extends axially of the spindle 87 in the absence of a cake in the manner previously described with reference to FIG. 7 and engages and depresses a lever 84 causing a receptor 85 to extend from the axis of the container 81. Member 83 engages the receptor 85 and rotates the carrier 86 about the axis of the pipe 79. The rotary motion of the carrier 86 causes the cakes thereon to be moved towards the annular support 75 and a cake to be thereby loaded on to the spindle 87.

Immediately thereafter the same rotary motion of the carrier 86 causes the receptor 85 to withdraw and also resets the lever 84. The container 81 may be removed when empty from the arm 80 and replaced by another container having a further supply of cakes 82.

Figure 9:
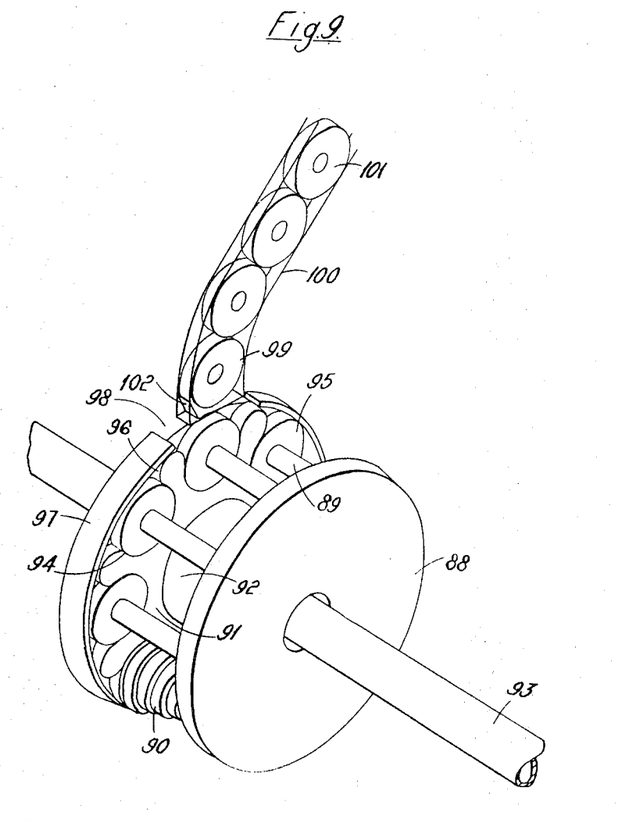

FIG. 9 shows a further example of a method of supplying cakes to the spindles for the helical rovings. An annular support 88 carries eight spindles 89. For the sake of clarity only one of the spindles 89 is shown loaded with a graded stack of cakes 90. In normal operation all the spindles 89 would carry cakes 90. A carrier 91 is rigidly joined to the annular support 88 by means of a tubular member 92. The axial spacing of the carrier 91 from the annular support 88 is such that the spindles 89 do not enter recesses 94 in the carrier 91. The carrier 91 and the annular support 88 are together rotatable about the axis of the pipe 93. The carrier 91 has eight recesses 94 of a suitable size to receive cakes 95, each recess 94 being positioned so that the axis of any cake within it is aligned with the axis of its associated spindle. The outer edges of the recesses 94 preferably have substantial radii 96. Surrounding the carrier 91 is a fixed annular guard 97 which does not rotate with the carrier 91 and which serves to retain the cakes 95 and may also provide support for the carrier 91 by means of suitable bearings. The guard 97 has a gap 98 of sufficient width to permit a cake 99 to drop readily into a recess 94. A chute 100, preferably of open construction, delivers a supply of cakes 101 to the top of the carrier 91. A restraint 102 prevents the cake 99 from coming into contact with the carrier 91 or the cakes 95 until a vacant recess 94 appears below the chute 100. The restraint 102 will be operated by detection means which determine the presence or absence of a cake within any recess 94. When any cake on any spindle 89 runs out a sequential movement of the remaining cakes, substantially as previously described, will take place and this movement will include the cake 95 within the carrier 91 associated with that spindle.

In an alternative arrangement, the carrier 91 and guard 97 are slidably mounted on the tubular member 92 and move forward to place cakes on all spindles simultaneously, this operation being carried out when suitable detection means indicate that all spindles have at least one cake missing.

In order to prevent significant discontinuities in the layup of the rovings on the pipe when the sequential movement of the cakes previously described takes place, it will be necessary to ensure that each roving is shifted to the next adjacent tension means and guides substantially simultaneously with the movement of the cake from which it is supplied. According to one arrangement each roving will shift as a result of the movement of its cake, this result being obtained by suitable configuration of the tensioners and guides and by arranging appropriate lead angles for the rovings.

Figure 10:
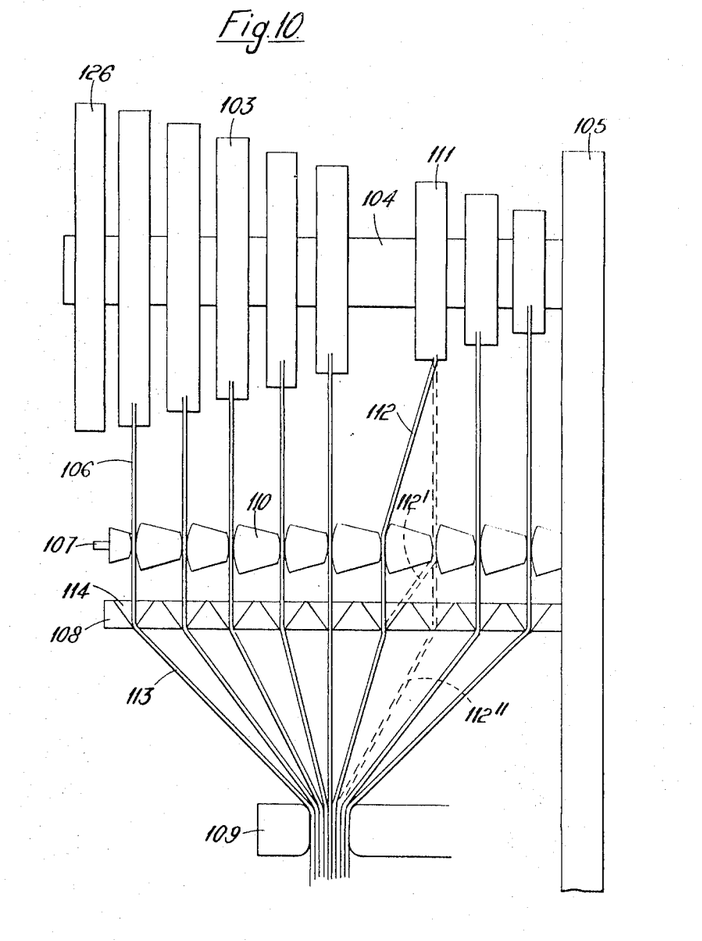
FIG. 10 illustrates an arrangement for bringing about shifting of the rovings as the cakes are shifted along a cake-carrying spindle.
Figure 11:
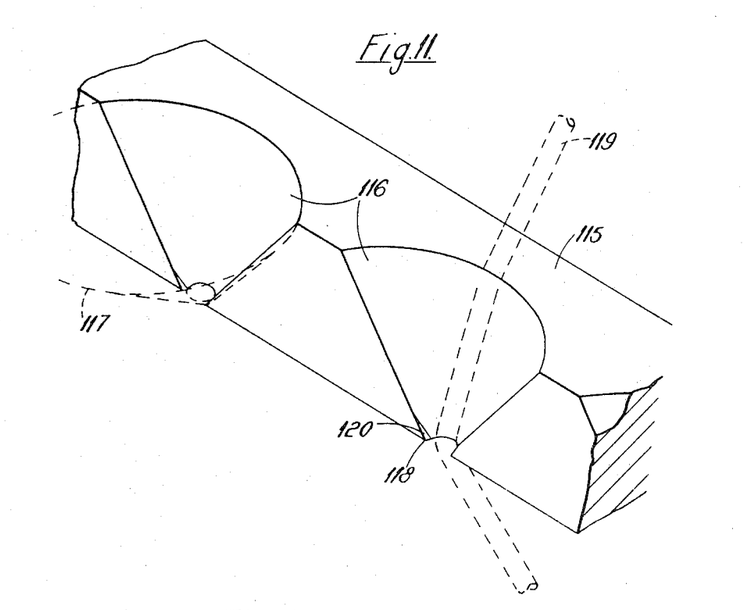
FIG. 11 shows a detail of the arrangement of FIG. 10.

FIGS. 10 and 11 show an example of an arrangement which may be used to obtain such a shift of the rovings. FIG. 10 shows a general arrangement in which cakes 103 are carried on a spindle 104, which is mounted on the annular support 105. Rovings 106 from the cakes 103 are led via tension means 107 and guide 18 to a gather 109. A spare cake 126 from which no rovings are led is also mounted on the spindle 104. The tension means 107 consists of spring-loaded members 110 shaped so that when any cake 111 moves on the spindle 104, as previously described, the roving 112 which is led from it is caused to pass across the tension means 107 to a new position 112'. Movement to the position 112' will in turn cause the roving to move across the guide 108 to position 112''. The portions 113 of the rovings may make sharp angles with the guide 108 on the way to the gatherer 109. The recesses 114 within the guide 108 will require to be suitably shaped to prevent the rovings 112, 113 from moving across the guide 108 and tension means 107 as a result of the aforementioned angle. FIG. 11 shows one example of a configuration in which the guide 115 has recesses 116 whose surfaces are substantially the interpenetration face of a slant cone 117 with the guide 115. After leaving the smaller end 118 of the recess 116 the roving 119 may be led away somewhat rearwardly of the recess 116. Chamfers 120 or radii may be provided over all or part of the length of the edges of the recesses 114.

Figure 12:
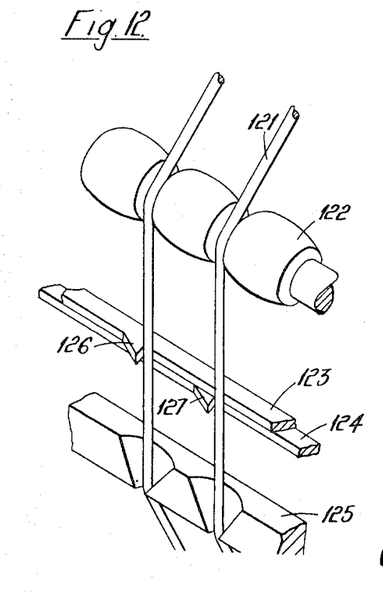
FIG. 12 illustrates another means for shifting rovings.

When for any reason it is not possible to lead the rovings so as to ensure that they shift on the tensioners and guides entirely as a result of movement of the cakes, additional shifting means may be provided, preferably coacting with the means for providing sequential movement of the cakes as previously described. FIG. 12 shows an example of such shifting means interposed between the tension means and the fixed guides. The rovings 121 pass over the tension means 122 and thence in front of shift bars 123, 124 before being led through the guide 125. Shift bars 123, 124 move sequentially in unison with the cakes, whereby the projections 126, 127 urge the rovings 121 to the next positions on the tension means 122 and guide 125. In an alternative arrangement there is only one shift bar which moves all the rovings simultaneously, preferably at the moment that an outer or spare cake is moved on the spindle.

In other arrangements the shift bar or bars may be interposed between the spindle and the tension means, or two complete shift bar systems may be used, one between the spindle and tension means and one between the tension means and the guides.

It may be required for a variety of reasons to alter the angle of layup of the helical rovings, as for example if it is desired to produce a pipe of different diameter or if the total number of rovings is changed. Thus, provision may be made for readily altering the position of the gatherer 109, previously described with reference to FIG. 10, and its orientation with respect to the annular support 105. Provision may also be made for adjusting the position of any or all of the tension means and guides in order that appropriate lead angles for the rovings may be maintained.

At the end of any sequential movement of cakes on a spindle as previously described, a spare cake will be fed on to that spindle. The free or outer end of the roving contained on the spare cake will be gathered and held adjacent to the roving supplied from the outermost working cake. When the next sequential movement takes place the end of the roving from the spare cake will be placed against the roving from the outermost working cake, and sufficient pressure and heat applied to ensure that the rovings join together by virtue of the cure of their resin impregnation. Preferably this operation will take place sufficiently early in the sequential movement of the cakes to ensure that the join has passed clear of the tension means and guides before the outermost working cake moves along the spindle.

There may be provided a system for continuous pressure testing of the completed pipe, by maintaining within the pipe a zone containing a fluid under pressure. Such a zone will be sealed at either end by pistonlike members which are coupled so as to preserve a constant distance from each other and are free to move along the pipe. Fluid under pressure is introduced into the zone between the pistons at a flow rate equal to the known loss past the pistons. Leakage through the pipe walls will be detected as a fall in the supply pressures of the fluid. In the preferred arrangement, the pressure testing system will be positioned within the pipe at a point where the manufacturing process has been completed.

Figure 13:
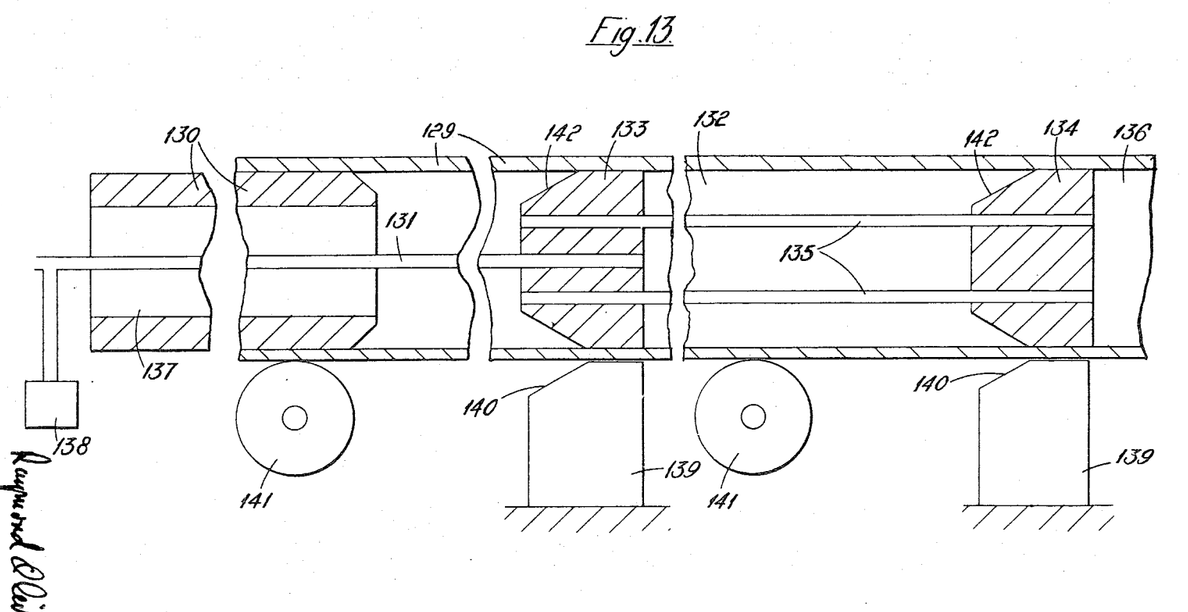
FIG. 13 illustrates means for pressure testing the completed pipe.

One example of such a pressure testing device is shown diagrammatically in FIG. 13. The pipe 129 leaves the mandrel in a cured condition. Further layers of plastics or rovings (not shown) may be applied. A tube 131 passes within the mandrel and carries fluid under pressure to a cavity 132 defined by the walls of the pipe 129 and two pistons 133, 134. Pistons 133, 134 have substantial chamfers 142 at the edges facing the mandrel, to facilitate entry into the pipe at the start of manufacture. Pistons 133, 134 are joined by pipes 135 which pass right through them and vent any pressure due to escape of fluid into the portion 136 of the pipe 129 remote from the mandrel 130. The pipes 134 are preferably either flexible, or flexibly jointed at their ends to the pistons 133, 134. The mandrel 130 contains a passage 137 extending over its whole length through which fluid lost past pistons 133, 134 may escape. The fluid pressure in the pipe 129 and cavity 132 is monitored by a pressure sensitive device 138. When not within the pipe 129 the pistons 133, 134 may be supported on or within mountings 139. The mountings 139 may have chamfers 140 adapted to direct the pipe 129 at the start of manufacture. Rollers 141 may be used to support the pipe 129 and any apparatus carried within it during manufacture.

A machine for making pipes in accordance with this invention can be installed in a suitable vehicle from which the pipe may be laid as it is manufactured, either on land or on water.

Two or more pipes, not necessarily of the same diameter may be produced substantially as hereinbefore described. These pipes may then be joined by banding or other suitable means so that they lie side by side with their axes substantially parallel. When the pipes are being laid in water it may be arranged that at least one of the pipes is filled with air or other gas to act as a flotation means for the remaining pipe or pipes.

Alternatively, when it is desired to sink the pipes to the bed of any body of water at least one of the pipes can be filled with concrete or ballast or some other dense particulate material which may be introduced into the pipe or pipes by pumping it in suspension in a liquid. Pipes to be used for ballast purposes may have the pressure test omitted from the manufacturing process, in which case the ballast may conveniently be introduced into such pipes by means of a tube passing through the mandrel and into the bore of the completed pipe.

In the laying of pipes under the sea, for example, the ballast used for the sinker pipe may conveniently be shingle, sand or mud dredged up from the sea bed. In a preferred arrangement, there may be inner and outer coaxial pipes wound simultaneously by the one pipemaking machine, with suitable spacers introduced to keep them substantially concentric. The inner pipe would then contain the material to be conveyed, e.g. gas, while the annular space between the inner and outer pipes would be filled with sea bed materials as ballast. This would ensure that the inner pipe was mechanically protected while the sinking force would be uniform and no undesirable twisting force introduced.

Alternatively, single pipe may be water filled to produce negative buoyancy during laying. After laying, the pipe may be retained on the sea bed by, for example, burying it in concrete ballast, and the water can then be expelled, using well gas pressure if the pipe is to be employed for conveying natural gas. By this means, the stresses that the pipe encounters during laying can be substantially reduced and pipe manufactured according to the invention may be laid in much greater water depths than is currently possible.

While the manufacture of glass-fiber reinforced synthetic plastics pipe has been described, it will be understood that similar techniques can be employed with other reinforcing fibers or filaments, such as carbon fibers or high tensile steel wires, and with other bonding materials, such as aluminum, lead, zinc alloys.

I claim:

1. A continuous bonded fiber pipemaking machine, comprising a mandrel, winding means for winding helically on to said mandrel reinforcing rovings preimpregnated with bonding material, carrier spindles carrying supply bobbins from which said reinforcing rovings are drawn by said winding means, curing means for curing the bonding material after winding of the rovings on to said mandrel to form a pipe, bobbin-changing means bringing a spare bobbin into use automatically when a bobbin in use runs out, and bobbin supply means automatically replacing said spare bobbin by a fresh spare bobbin from a stock of bobbins.

2. A machine according to claim 23, wherein said mandrel is nonrotary and an annular extrusion head extrudes over said mandrel a tubular layer of plastics material which progresses axially through a plurality of stations at which are located said winding means, the winding means at each station comprising a support rotating about the axis of the mandrel and carrying said spindles for the bobbins and guide means for the helical rovings.

3. A machine according to claim 2, wherein axial reinforcing rovings are also laid on the extruded tube from bobbins on stationary bobbin carriers.

4. A machine according to claim 2, wherein the bobbins are in the form of cakes without cores or formers.

5. A machine according to claim 4, wherein the mandrel axis is vertical, or substantially so, enabling the carrier spindles for the cakes supplying the helical rovings to be likewise vertical or substantially so, and shifting of the cakes along a spindle takes place by gravity under the control of automatic latch means.

6. A machine according to claim 4, wherein the mandrel axis is horizontal, or substantially so, the carrier spindles for the cakes supplying the helical rovings being likewise horizontal, and powered cake-shifting means are provided in association with each spindle and rendered operative automatically upon occurrence of less than the full number of working cakes on that spindle, to shift the spare cake along the spindle into a working position and so make up the full working complement of cakes.

7. A machine according to claim 2, wherein said bobbin supply means comprises means to hold a supply of fresh cakes, in combination with transfer means operative to place a fresh cake from the supply on to any carrier spindle which has a cake missing.

8. A machine according to claim 7, wherein each rotating support applying the helical rovings bears a plurality of cake-carrying spindles parallel to and disposed around the mandrel axis at equal radial distances therefrom, the fresh cakes held by the fresh cake supply-holding means advance from time to time to arrive one after another at a position close to the path followed by said spindles as they rotate with said support, and the absence of a cake on any of the spindles initiates operation of the transfer means as that spindle arrives adjacent said position, the transfer means serving both to transfer a fresh cake to said spindle and simultaneously impart to that cake an angular acceleration about the mandrel axis whereby the transfer takes place without stopping of the rotation.

9. A machine according to claim 8, wherein the fresh cake supply-holding means comprise a chute down which the cakes advance under gravity.

10. A machine according to claim 8, wherein the transfer means comprise a cake holder that is rotatable with the support.

11. A machine according to claim 7, wherein the fresh cake supply-holding means comprise a cake container that is mounted for rotation about the mandrel axis at the same radius as the spindles on the support, and the transfer means comprise a pickup device whereby the cake container is angularly accelerated by any spindle which has a cake missing and becomes temporarily coupled to that spindle for transfer of a fresh cake thereto.

12. A machine according to claim 4, wherein said guide means for the rovings from a plurality of cakes along any one spindle are disposed in a row parallel to said spindle, in an arrangement such that the rovings automatically transfer from one guide to the next along the row as the cakes are shifted along the spindle.

13. A machine according to claim 12, and comprising a shifter bar operative upon shifting of the cakes along the spindle to engage the rovings and shift them along the row of guides.

14. A machine according to claim 4, and comprising means to bond the end of the roving of a spare cake to the roving of a working cake alongside it as shifting of the spare cake along the spindle into a working position occurs.

15. A machine according to claim 1, and comprising a continuous pressure-testing station through which the pipe is fed after it has been formed.

16. A machine according to claim 15, wherein the pressure-testing means comprises two interconnected pistons within the pipe and around which the pipe slides, which pistons define between them a chamber to which pressure fluid is introduced through the mandrel.

17. A machine according to claim 1, for making two or more pipes simultaneously either alongside one another or coaxial.

18. A machine according to claim 17, with provision for introducing material into at least one of the pipes through the respective mandrel as it is made.